United States Patent [19]

Kwon

[11] Patent Number: 4,668,287
[45] Date of Patent: May 26, 1987

[54] PROCESS FOR PRODUCING HIGH PURITY ZIRCONIUM AND HAFNIUM

[75] Inventor: Young J. Kwon, Fruit Heights, Utah

[73] Assignee: Westinghouse Electric Corp., Pittsburgh, Pa.

[21] Appl. No.: 780,342

[22] Filed: Sep. 26, 1985

[51] Int. Cl.⁴ ........................................... C22B 34/10
[52] U.S. Cl. ...................... 75/84.5; 75/84.4; 266/171; 266/205; 266/271; 266/905; 373/109; 373/110; 373/112; 373/115; 423/69; 423/76
[58] Field of Search ................ 75/84.5, 84.4; 373/109, 373/110, 112, 115; 266/271, 171, 205, 905; 423/69, 76

[56] References Cited

U.S. PATENT DOCUMENTS

| | | | |
|---|---|---|---|
| 2,787,539 | 4/1957 | Conklin | 75/84.5 |
| 2,916,362 | 12/1959 | Horrigan | 23/294 |
| 3,057,682 | 10/1962 | Groce | 23/114 |
| 3,715,205 | 2/1973 | Ishizuka | 75/84.5 |
| 3,966,458 | 6/1976 | Spink | 75/84.5 |
| 3,966,460 | 6/1976 | Spink | 75/84.4 |
| 4,127,409 | 11/1978 | Megy | 75/84.5 |
| 4,200,492 | 4/1980 | Armijo et al. | 176/82 |
| 4,285,724 | 8/1981 | Becker et al. | 75/84.5 |
| 4,368,072 | 1/1983 | Siddall | 75/84.4 |
| 4,372,817 | 2/1983 | Armijo et al. | 376/417 |
| 4,447,045 | 5/1984 | Kimura et al. | 266/149 |
| 4,556,420 | 12/1985 | Evans et al. | 75/84.5 |

Primary Examiner—Stephen J. Lechert, Jr.
Attorney, Agent, or Firm—R. A. Stoltz

[57] ABSTRACT

This is a process for producing high quality zirconium or hafnium sponge. It is especially useful for producing the very high purity zirconium which may be used to line the inner surface zirconium of Zircaloy tubing for nuclear fuel rods. The process uses a combination reduction-distillation vessel which is directly fed with zirconium or hafnium tetrachloride from a molten salt sublimer. A precharge of magnesium chloride is used to prevent reduction of metal outside the inner liner, and thereby facilitate removal of the inner liner after reduction and distillation. The agitator for the molten salt sublimer preferably utilizes a molten metal seal around the agitator shaft.

8 Claims, 3 Drawing Figures

PROCESS FOR PRODUCING HIGH PURITY ZIRCONIUM AND HAFNIUM

CROSS-REFERENCE TO RELATED APPLICATIONS

A high purity sponge material and a process utilizing this material is described in related application Ser. No. 780,343 (W.E. Case No. 52,830) assigned to the same assignee and filed herewith and incorporated by reference herein. Although the sponge of that related application might be produced by other methods, the method of the instant invention is the preferred method of making that sponge.

A process utilizing a combination reduction and distillation furnace is described in related copending application Ser. No. 546,601, assigned to the same assignee, and that related application is incorporated by reference herein. The instant invention utilizes certain features and an improvement on that related application.

BACKGROUND OF THE INVENTION

1. Field of the Invention

This invention relates to metallurgy and to zirconium and hafnium metallic compositions, and in particular to a method for making very high purity reactive metal sponge.

2. Description of the Prior Art

In the commercial production of zirconium and hafnium metal, the ore is generally initially subjected to a chlorination step which produces a relatively impure, hafnium containing zirconium tetrachloride and by-product silicon tetrachloride (which by-product is relatively easy separated). The hafnium and zirconium containing material is then subjected to a number of purifying operations and also a complex hafnium separation operation. These operations result in purified oxides of zirconium and hafnium, which, of course, are maintained separate. The purified oxides are then separately chlorinated. Zirconium and hafnium are commonly reduced from the chloride by means of a reducing metal such as magnesium. At the present time, the commercial processes are batch-type processes. U.S. Pat. No. 3,966,460, for example, describes a process of introducing zirconium tetrachloride vapor onto molten magnesium, with the zirconium being reduced and traveling down through the magnesium layer to the bottom of the reactor and with the by-product magnesium chloride being periodically removed. In the commercial processes, however, the by-product salt (e.g. magnesium chloride) remains till the batch is completed and cooled. The salt and metallic sponge (zirconium or hafnium) are then removed from the reduction vessel. A portion of the salt is manually removed. The metallic sponge (containing remaining salt and some remaining excess reducing metal) is then placed in a distillation vessel for removal of the remaining salt and magnesium by high temperature vacuum distillation.

Combination reduction and distillation furnaces have been proposed in the past, as well as arrangements for intermediate tapping of magnesium chloride, for example, in U.S. Pat. No. 2,787,539 to Kunklin, issued Apr. 2, 1957. Intermediate tapping of magnesium chloride together with a separate vessel for feeding zirconium tetrachloride is taught in U.S. Pat. No. 3,715,205 to Ishizuka on Feb. 6, 1973.

Molten salt systems for purification but not for directly feeding reduction of zirconium tetrachloride have also been proposed, in U.S. Pat. No. 2,916,362 to Horrigan and 3,057,682 to Groce, with Groce in addition proposing adding finely divided zirconium metal for greater purification. Zirconium and hafnium have also been purified by iodide cells to produce so-called "crystal bar" material. This is a rather expensive step which is performed after reduction and is discussed, for example, in U.S. Pat. No. 4,368,072 issued to Siddall on Jan. 11, 1983.

Ultrapure zirconium has been proposed for a liner for the inside surface of Zircaloy tubing which is used as cladding for nuclear fuel and is described in, for example, U.S. Pat. No. 4,372,817 to Armijo et al on Feb. 8, 1983. A similar use of a moderate purity material is proposed in U.S. Pat. No. 4,200,492 to Armijo on Apr. 29, 1980.

SUMMARY OF THE INVENTION

This is a process for producing high purity zirconium and hafnium without resorting to expensive crystal bar processing. The material produced has low levels of total impurities, iron, and oxygen. While the oxygen level of material of this process is slightly higher than crystal bar material, the processing is considerably less expensive and the extremely low oxygen level of crystal bar material is generally unnecessary. Further, this process provides a very effective production method and is practical even for use in making Zircaloy, for example, where the low levels of iron and oxygen are not required.

This is an improved process for producing the zirconium or hafnium and utilizes introducing magnesium chloride into a combination reduction-distillation vessel which as an inner liner with a bottom drain opening which provides fluid communication between the vessel and the liner. Prior to initiation of reduction, magnesium chloride is added in a quantity to fill the vessel and the inner liner to above the liner bottom drain opening such that when magnesium is put in the inner liner, the magnesium will be maintained within the inner liner, thus avoiding reduction outside the inner liner and problems in withdrawing the inner liner resulting therefrom. Magnesium, preferably containing less than 100 ppm of oxygen, is introduced into the inner liner. A molten salt bath containing at least one salt selected from the group consisting of sodium chloride, potassium chloride, aluminum chloride, and lithium chloride is prepared and zirconium or hafnium tetrachloride is fed into the molten salt bath (and at least periodically and preferably continuously agitated). Zirconium or hafnium tetrachloride vapor is gathered from above the molten salt bath and fed directly into the inner liner to react with the magnesium to produce zirconium or hafnium metal (which is collected within the inner liner) and by product molten magnesium chloride. Periodically part of the molten magnesium chloride is drained, but the molten magnesium chloride level is maintained above the bottom liner drain opening. After the feeding of tetrachloride is ceased, all drainable magnesium chloride (and excess magnesium) is drained from the vessel and a vacuum is pulled on the vessel to remove residual magnesium and magnesium chloride from the zirconium or hafnium metal. As reduction of metal outside the inner liner has been avoided, the inner liner can then be easily removed from the vessel.

BRIEF DESCRIPTION OF THE DRAWINGS

This invention can be best understood by reference to the following drawings, in which.

DESCRIPTION OF THE PREFERRED EMBODIMENTS

Figure 1:
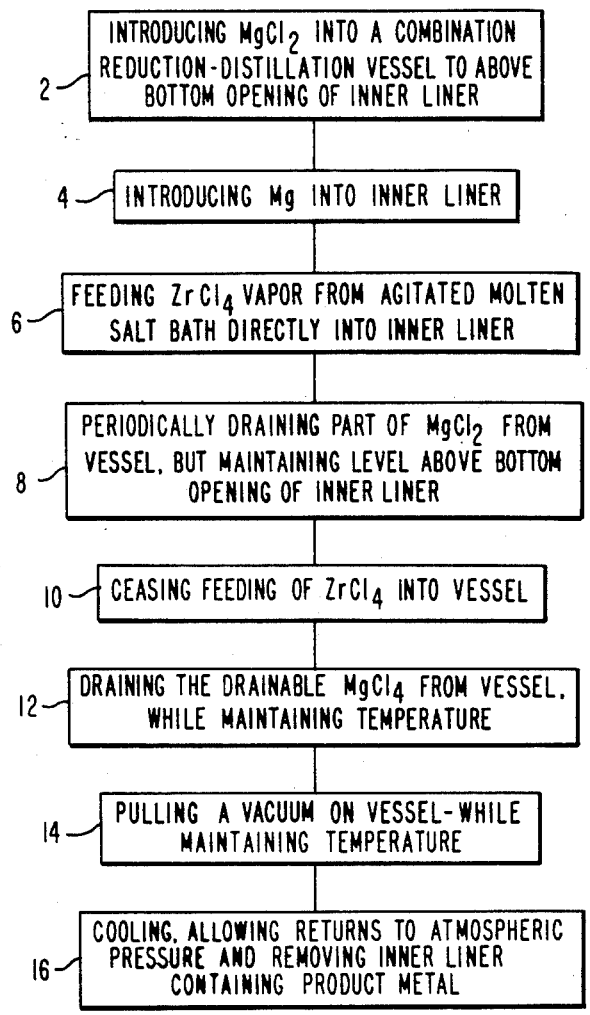
FIG. 1 is a block diagram showing one embodiment of the invention.

This invention provides a process for producing a very high quality hafnium or zirconium, and is the first process to produce metallic sponge of this quality. In addition, the process is highly effective and can be advantageously used for producing metal for a wide range of applications. While the process is a combination of a number of steps, it is critical that the zirconium or hafnium tetrachloride be fed directly from the molten salt sublimer into the reduction vessel, thereby avoiding contamination of the tetrachloride.

One usage of zirconium of such purity is for the inner lining of Zircaloy tubing for use in nuclear reactors. The material of this process contains about 50-300 ppm of iron, 250-350 ppm of oxygen and total impurities of 500-1000 ppm. Thus this material has slightly higher oxygen, but generally crystal bar-like purity, without the expense of crystal bar processing.

In this process, magnesium chloride (normally a by-product of the process) is preloaded into the combination reduction-distillation vessel to maintain the lighter magnesium inside the inner liner, yet allowing draining of fluids from the inner liner after the run is complete. In addition, this avoids having to make either mechanical pipe connections or other mechanical valving arrangements between the inner liner and the reduction-distillation vessel. Again, maintaining the magnesium inside the inner liner avoids reduction of tetrachloride by magnesium in the annulus between the outside of the inner liner and the reduction-distillation vessel and the difficulties in removing the inner liner stemming from metal in the annulus.

Magnesium metal is introduced into the inner liner. Although magnesium containing greater amounts of oxygen can be used for some applications, magnesium containing less than 100 ppm of oxygen should be used for making low oxygen sponge. It should be noted that while the oxygen content of magnesium metal varies widely, and is difficult to measure, magnesium containing typically about 75 ppm of oxygen is commercially available.

A fused salt sublimer is used to feed tetrachloride into the reduction-distillation vessel. The zirconium or hafnium tetrachloride to be reduced can be all added to the molten salt sublimer prior to the reduction run, but preferably at least some tetrachloride is added to the sublimer as the reduction proceeds. The sublimer contains at least one other salt selected from the group consisting of sodium chloride, potassium chloride, aluminum chloride, and lithium chloride. Preferably, the tetrachloride is added to a 50—50 molar % sodium chloride, potassium chloride mixture, as such a mixture is inexpensive and effective. The use of both sodium chloride and potassium chloride provides, of course, a lower melting system. Pure chloride ($ZrCl_4$ or $HfCl_4$) can be fed into the fused salt sublimer in a controlled method with a storage hopper and feed system under inert gas purged to avoid any air leakage to the system. The fused salt sublimer consists of a stainless steel vessel, preferably 316 stainless, electrically heated with temperature control, agitator, and agitator seal, with an internal baffle to minimize dust entrainment. The fused salt method for sublimation of the tetrachloride provides significant advantages as the fused salt has high solubility for metal chloride contaminants such as iron chloride, aluminum chloride, uranium chloride, thorium chloride, as well as other chlorides, and has been found to reduce the phosphorous level in the final product. In addition the fused salt acts as a filter to clean up oxide and carbon contaminants. The agitator in the fused salt sublimer is very important to assure uniform mixing of zirconium or hafnium tetrachloride with the salt melts, and also to increase heat transfer. It has been found that the seal design of the agitator shaft should not be a standard one, because both the packing gland seal and mechanical seal arrangements require inert gas purge for trouble-free operation. The inert gas purge should be avoided, however, because it reduces the partial pressure of zirconium or hafnium chloride in the reaction zone and thus causes a sluggish reaction. This invention utilizes a unique seal which contains a molten mixture, preferably of lead-animony.

The sodium chloride, potassium chloride fused salt sublimer preferably operates at 300°–400° C. with the temperature being controlled to control the rate of sublimation as required by the reduction reaction.

Generally the reduction-distillation vessel can be of stainless steel, with the inner liner being made of carbon steel. The vessel can be electrically or gas fired.

In the reactor, molten magnesium is reacted with chloride vapor to produce metal (zirconium or hafnium) and magnesium chloride. The molten magnesium chloride is occasionally drained (tapped), in a manner similar to that practiced in the titanium reduction process. Generally, the magnesium is all loaded prior to the initiation of the reduction process, however, magnesium could be added during operation. Preferably, some excess magnesium is provided and thus the feeding of the tetrachloride is ceased to halt the process. When the reduction is finished, the vessel is drained of essentially all drainable magnesium chloride and any drainable excess magnesium. The metal sponge mass is ready for distillation without need of increasing temperature. By opening a valve between the reactor and condenser and starting the vacuum pump system, magnesium and magnesium chloride are vaporized and condensed in the condenser. A magnesium sealing valve can be used between the reduction-distillation vessel and the condenser to eliminate leakage problems. One such sealing valve is shown in U.S. Pat. No. 4,447,045 to Kimura et al., issued May 8, 1984. In order to close such valves, molten magnesium is poured in and the mass is cooled and solidified. When the valve is to be opened, heat is applied to melt the magnesium. In Kimura, the magnesium is removed from the valve by vaporizing and then collected in a condenser.

Initially, 50 kilogram batches of zirconium sponge were made from this process and very high quality sponge was achieved (see Table I below, N/M indicates "not measured"). Although the iron level is very low, further reduction of iron can be achieved by subjecting the zirconium or hafnium metal to electron beam melting. As noted above, the addition of a small amount of metal fines (zirconium or hafnium) in the molten salt sublimer, significantly lowers the oxygen level in the metal product.

TABLE I

SPONGE QUALITY (50 Kg BATCH)
(Impurities in ppm)

|    | Run 1 | Run 2 | Run 3 |
|----|-------|-------|-------|
| Al | 12    | 12    | <10   |
| Fe | 103   | <100  | 147   |
| P  | N/M   | N/M   | <1.0  |
| N  | <20   | <20   | 22    |
| O  | 340   | 396   | 393   |
|    |       |       | 353   |
| C  | N/M   | N/M   | 90    |

FIG. 1 generally summarizes the process of this invention. Only by combining all of the elements, and particularly by the molten salt sublimer system which feeds directly to the reduction vessel from the agitated bath can the desired purity be obtained.

The high purity sponge can be further processed into a high purity ingot without resorting to the iodide (crystal bar) process. The ingot can be electron beam melted if necessary. In making nuclear reactor cladding, the ingot is further processed into a so-called "tube shell" and into a "trex". For processing into lined fuel element cladding, the trex can have an outer cylinder of Zircaloy with an inner cylinder of material of the high purity of this process.

Figure 2:
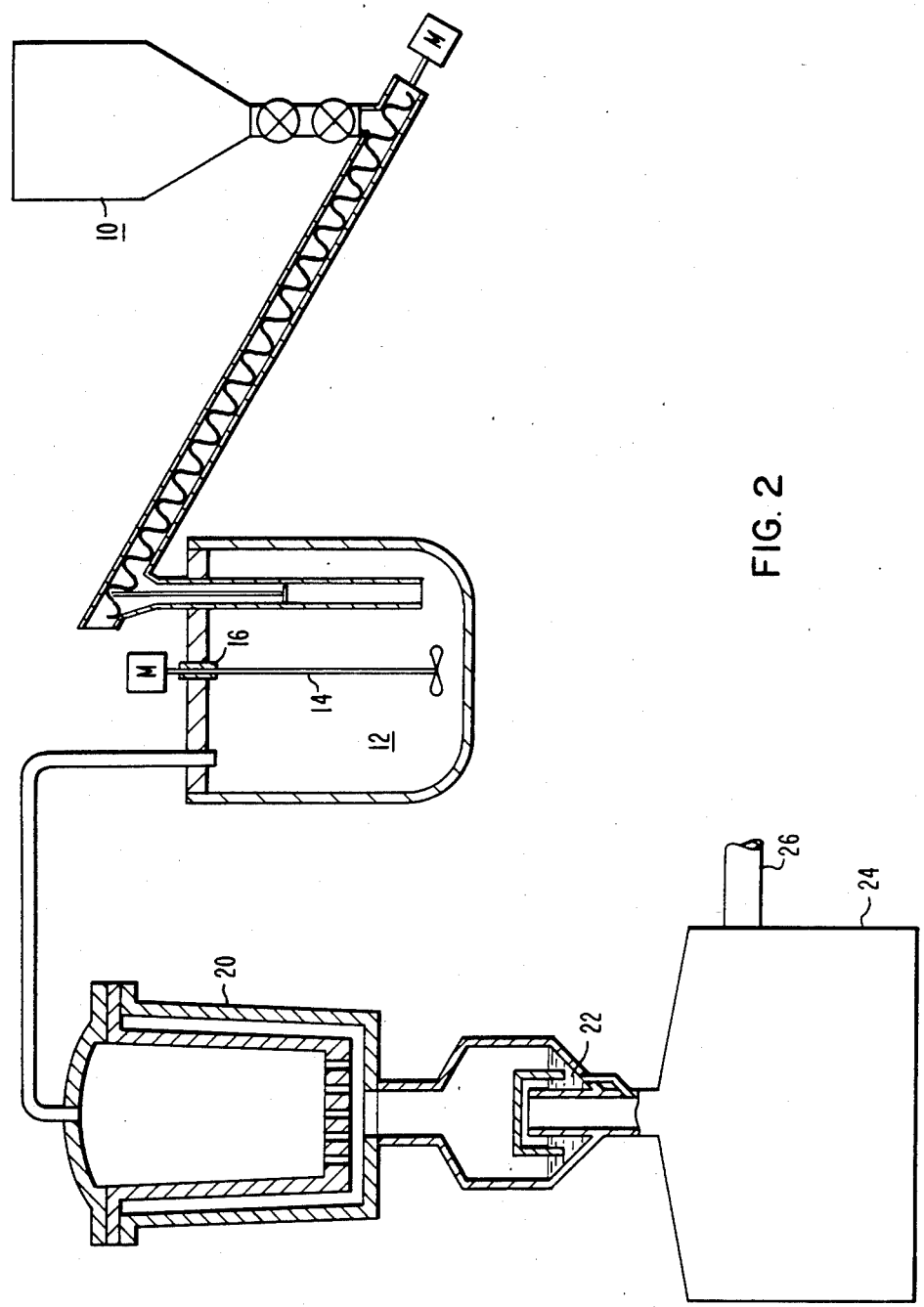
FIG. 2 shows an elevation, in section, of a combined furnace.

FIG. 2 generally illustrates an apparatus for the exercise of this invention. Tetrachloride is fed from a hopper 10 into the fused salt sublimer 12. An agitator 14 stirs the molten salt with leakage being prevented by the molten metal seal 16 (preferably lead antimony). Tetrachloride sublimes from the surface of the molten salt and is fed directly into the inner liner 18 of the reduction-distillation vessel 20. A magnesium seal 22 can be used to isolate the condenser 24 and vacuum system 26 from the reduction-distillation vessel during the reduction operation but to open and connect the condenser 24 and vacuum system 26 with the reduction-distillation vessel 20 during the distillation phase.

Figure 3:
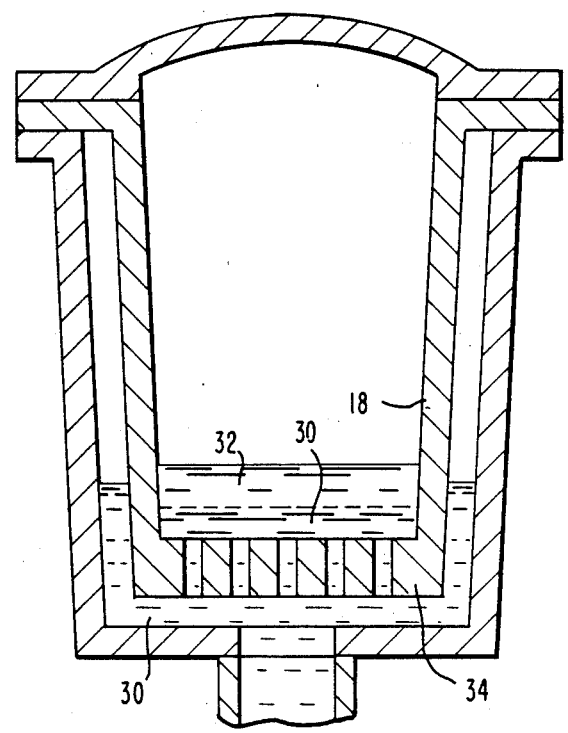
FIG. 3 shows an elevation, in section, illustrating the precharging with magnesium chloride to establish a salt seal.

FIG. 3 shows the use of magnesium chloride 30 to maintain the molten magnesium 32 above the grid plate 34 (which contains at least one opening, but preferably a large number of openings to allow more rapid and complete draining of magnesium and magnesium chloride after the reduction is completed).

Table 2, below, shows the general impurities as anticipated in a 5,000 pound batch of material. This is an intermediate sized production batch and in a full sized furnace, even lower impurities, especially iron, are anticipated.

TABLE II

SPONGE QUALITY (5000 LBS. BATCH)
(Impurities in ppm)

| Al | <20     |
|----|---------|
| Fe | 100-200 |
| P  | <5      |
| N  | <20-30  |
| O  | 250-350 |
| C  | 40-100  |

The invention is not to be construed as limited to the particular examples described herein, as these are to be regarded as illustrative rather than restrictive. The invention is intended to cover all the processes which do not depart from the spirit and scope of the invention.

I claim:
1. An improved process for producing zirconium or hafnium, said process being of the type wherein a tetrachloride of zirconium or hafnium is reduced by magnesium and the resulting metal is subjected to a distillation treatment, the improvement comprising:
   a. introducing magnesium chloride into a combination reduction-distillation vessel, said vessel having an inner liner with at least one bottom drain opening with said drain opening providing fluid communication between said vessel and said liner, said magnesium chloride being added in a quantity to fill said vessel and said inner liner to a level above said liner bottom drain opening, whereby said magnesium chloride provides a seal which prevents magnesium in the inner liner from flowing out of the inner liner;
   b. introducing magnesium into said inner liner;
   c. preparing a molten salt bath, said bath containing at least one salt selected from the group consisting of sodium chloride, potassium chloride, aluminum chloride and lithium chloride;
   d. feeding zirconium tetrachloride or hafnium tetrachloride into said molten salt bath and at least periodically agitating said molten bath;
   e. gathering zirconium tetrachloride or hafnium tetrachloride vapor from above said molten salt bath and feeding said vapor into said inner liner, said magnesium reacting with said zirconium tetrachloride or said hafnium tetrachloride to produce zirconium or hafnium metal which is collected within said inner liner and also producing molten magnesium chloride;
   f. periodically draining part of said molten magnesium chloride from said vessel but leaving a quantity to fill said vessel to a level above said liner bottom drain opening;
   g. ceasing the feeding of tetrachloride;
   h. draining essentially all drainable magnesium chloride from said vessel;
   i. pulling a vacuum on said vessel to remove residual magnesium and magnesium chloride from said metal; and
   j. removing said inner liner containing said metal from said vessel.

2. The process of claim 1, wherein said agitator for said molten salt bath has a shaft and a molten lead-antimony seal is provided around said shaft.

3. The process of claim 1, wherein said magnesium contains less than 100 ppm of oxygen.

4. The process of claim 1, wherein finely divided zirconium or hafnium is added to said molten salt bath.

5. The process of claim 1, wherein said molten salt bath is controlled to a temperature of 300–400 degrees C.

6. The process of claim 1, wherein the removal of the liner and metal from said vessel is followed by removing said metal from said liner and electron beam melting the metal.

7. A process for producing ultra high purity, low-oxygen, low-iron zirconium or hafnium, said process comprising:
   a. introducing magnesium chloride into a combination reduction-distillation vessel, said vessel having an inner liner with at least one bottom drain opening, said magnesium chloride being added in a quantity to fill said vessel and said inner liner to a level above said liner bottom drain opening;

b. preparing a molten salt bath, said bath containing sodium chloride and potassium chloride;

c. introducing magnesium containing less than 100 ppm oxygen into said inner liner;

d. feeding zirconium tetrachloride or hafnium tetrachloride into said molten salt bath and at least periodically agitating said molten bath, said bath being agitated by an agitator which has a shaft and a molten lead-antimony seal around said shaft and with said molten salt bath being controlled to a temperature of 300–400 degrees C.;

e. gathering zirconium tetrachloride or hafnium tetrachloride vapor from above said molten salt bath and feeding said vapor into combination reduction-distillation vessel, said magnesium reacting with said zirconium tetrachloride or said hafnium tetrachloride to produce zirconium or hafnium metal which is collected within said inner liner and also producing by-product magnesium chloride;

f. periodically removing part of said magnesium chloride;

g. ceasing feeding of tetrachloride and introduction of magnesium;

h. draining essentially all drainable magnesium chloride from said vessel;

i. pulling a vacuum on said vessel to remove residual magnesium and magnesium chloride from said metal, with the pulling of said vacuum being done with a vacuum system connected by a pipe to said vessel, and with a fusible magnesium sealing valve being provided in said pipe, said fusible magnesium sealing valve being solid during reduction but being fused open during the pulling of a vacuum on said vessel;

j. removing said inner liner containing said metal from said vessel, and k. removing said metal from said liner and electron beam melting said metal.

8. The process of claim 7, wherein finely divided zirconium or hafnium is added to said molten salt bath.

* * * * *